United States Patent [19]

Yashiro

[11] Patent Number: 5,168,186

[45] Date of Patent: Dec. 1, 1992

[54] SPINDLE MOTOR

[75] Inventor: Hirokazu Yashiro, Gifu, Japan

[73] Assignee: Ibiden Co., Ltd., Japan

[21] Appl. No.: 757,341

[22] Filed: Sep. 10, 1991

[51] Int. Cl.$^5$ .................. H02K 21/04; H02K 1/30
[52] U.S. Cl. .................... 310/47; 310/156;
310/262
[58] Field of Search .............. 310/47, 50, 40 MM, 90,
310/156, 261, 262

[56] References Cited

U.S. PATENT DOCUMENTS

| | | | |
|---|---|---|---|
| 3,121,179 | 2/1964 | Macks | 310/90 |
| 4,117,360 | 9/1978 | Richter | 310/183 |
| 5,019,738 | 5/1991 | Weilbach et al. | 310/90.5 |
| 5,032,751 | 7/1991 | Morita | 310/90.5 |
| 5,034,642 | 7/1991 | Hoemann et al. | 310/156 |

FOREIGN PATENT DOCUMENTS

| | | |
|---|---|---|
| 0178380 | 4/1986 | European Pat. Off. . |
| 0229911 | 7/1987 | European Pat. Off. . |
| 2258324 | 6/1974 | Fed. Rep. of Germany . |
| 3031416 | 3/1982 | Fed. Rep. of Germany . |
| 2197419 | 3/1974 | France . |
| 2208226 | 6/1974 | France . |
| 0049509 | 4/1979 | Japan .................. 310/90 |
| 59-198849 | 11/1984 | Japan . |

| | | |
|---|---|---|
| 1186381 | 4/1970 | United Kingdom . |

Primary Examiner—Steven L. Stephan
Assistant Examiner—Judson H. Jones
Attorney, Agent, or Firm—Stetina and Brunda

[57] ABSTRACT

A spindle motor for high speed hand tools includes a rotor and a sleeve that is journaled about the rotor. A pressure generating mechanism creates sufficient air pressure in a clearance between the rotor and the sleeve to form a pressurized air film in the clearance when the spindle motor is in normal operation. A plurality of armature coils and a plurality of magnetic sensors for detecting magnetism of magnetic poles in the rotor are provided on the outer surface of the sleeve. The rotor has a field magnet with multiple magnetic poles. The sleeve is formed of a ceramic material whose dielectric constant is 10 or lower. The pressurized air film created by the pressure generating mechanism is sufficient to radially support the rotor so that the rotor does not significantly contact the sleeve during normal operation of the spindle motor. The armature coils cooperate with the field magnet to rotate the rotor by the magnetic interaction between magnetic fields formed by the armature coils and the poles of the field magnet. The excitation of the armature coils is controlled at least in part by signals provided by the magnetic sensors.

20 Claims, 8 Drawing Sheets

SPINDLE MOTOR

BACKGROUND OF THE INVENTION

The present invention relates generally to a spindle motor, and more particularly, to a brushless spindle motor used in a dental handtool.

Dental handtools that include a handpiece having a drill and a spindle motor to rotate the drill are generally known. The spindle motor used in a handtool should rotate fast. It is therefore typical to use a brushless spindle motor that includes a rotor having multiple magnetic poles. Multiple armature coils are then provided around the rotor.

Conventional rotor are rotatably supported in the motor casing by a ball bearing. This causes the bearing to wear relatively quickly, thereby reducing the durability of the dental spindle motor that always rotates at a high speed.

To solve this shortcoming, the present inventor employed a pneumatic bearing as a rotor bearing means, and developed a spindle motor which supports the rotor in a non-contacting manner. The first developed spindle motor includes a rotor having a plurality of internal magnetic poles. A cylindrical sleeve rotatably supports the rotor and a plurality of armature coils are provided on the outer surface of the sleeve. Compressed air is then introduced from an external source into a clearance between the rotor and the sleeve, forming a pressurized air film in the clearance to lift the rotor from the sleeve.

When such a tool is in use, the rotor sometimes contacts the inner surface of the sleeve and slides. Further, the armature coils should be placed directly on the outer surface of the sleeve to decrease the diameter of the motor, and the thickness of the sleeve is accordingly limited. The sleeve therefore has to be formed of a material that creates little friction when it contacts the rotor. Additionally, high abrasion resistance, mechanical strength, and electrical insulating characteristics are also required. In this respect, silicon carbide was initially considered the most appropriate material for the sleeve.

However, when a silicon carbide sleeve is used in the spindle motor, the rotational speed of the rotor does not sufficiently reflect the amount of current supplied to the armature coils. Indeed, the smaller the motor is, the more prominent this phenomenon tends to be. It is therefore desirable to solve this problem in order to increase the practical applications for spindle motors with pneumatic bearings.

As a result of the intensive study of the above-described phenomenon, the present inventor has found that a magnetic field formed by the armature coils induced a current in the silicon carbide sleeve which heats the sleeve. A portion of the magnetic energy from the armature coils is therfore wasted as thermal energy.

SUMMARY OF THE INVENTION

Accordingly, it is a primary objective of the present invention to provide a spindle motor which can rotate faster and last longer than a conventional motor, and which can efficiently convert electrical energy supplied to its armature coils into kinetic energy of the rotor to rotate the rotor at a high speed.

To achieve the foregoing and other objects and in accordance with the purpose of the present invention, an improved spindle motor is provided. The spindle motor includes a rotor and a sleeve that is journaled about the rotor. A pressure generating mechanism creates sufficient air pressure in a clearance between the rotor and the sleeve to form a pressurized air film in the clearance when the spindle motor is in normal operation. A plurality of armature coils and a plurality of magnetic sensors for detecting magnetism of magnetic poles in the rotor are provided on the outer surface of the sleeve.

The rotor has a field magnet with multiple magnetic poles. The sleeve is formed of a ceramic material whose dielectric constant is 10 or lower. The pressurized air film created by the pressure generating mechanism is sufficient to radially supports the rotor so that the rotor does not significantly contact the sleeve during normal operation of the spindle motor. The armature coils cooperate with the field magnet to rotate the rotor by the magnetic interaction between magnetic fields formed by the armature coils and the poles of the field magnet. The excitation of the armature coils is controlled at least in part by signals provided by the magnetic sensors.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

The first to third preferred embodiments of a spindle motor according to the present invention as applied to a dental handtool will now be described referring to the accompanying drawings. A hydrostatic air bearing will be explained as a radial bearing in the motor in the first embodiment. A self-acting air bearing will serve as the radial bearing of the motor in the second embodiment. An improvement applicable to the motors in both first and second embodiments will be described in the third embodiment.

First Embodiment

Figure 1:
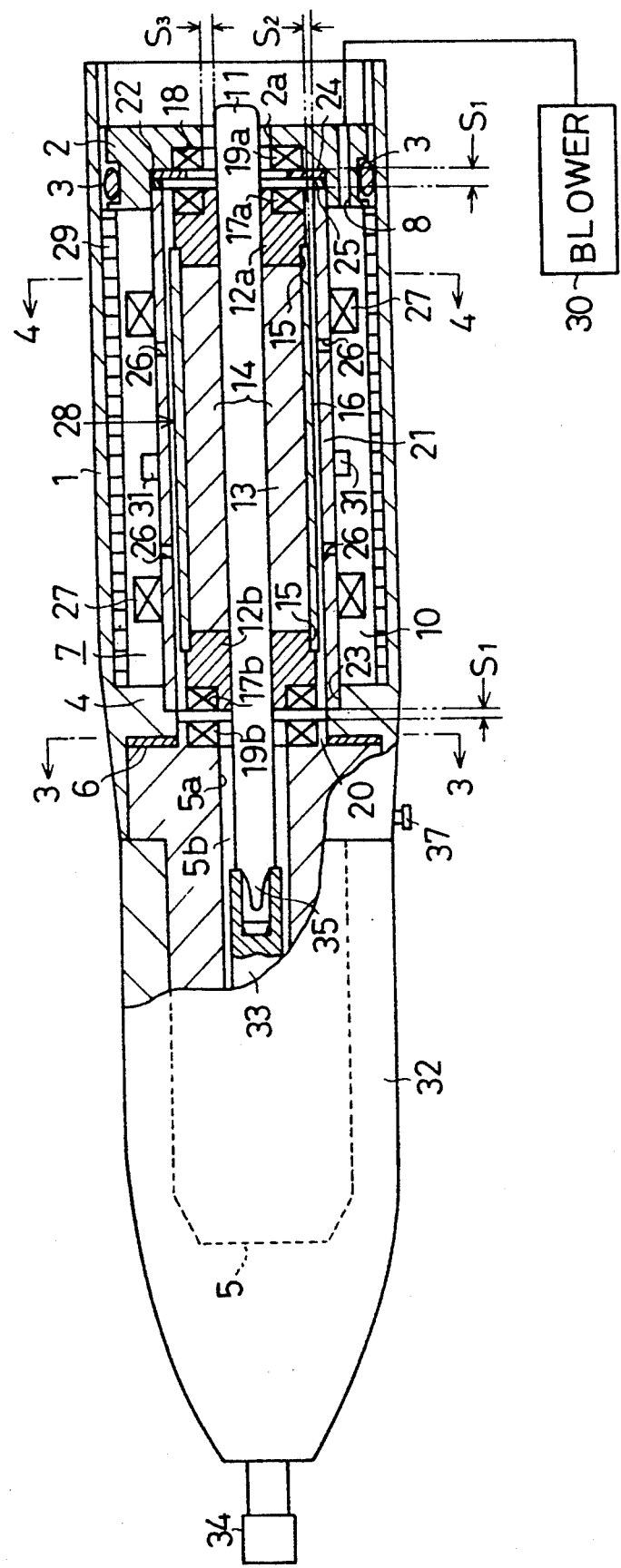
FIG. 1 is a cross section of a first embodiment of the present invention as applied to a dental handtool.

An end plate 2 is fixed to the inner proximal end of a nearly cylindrical casing 1 as shown in FIG. 1. An opening 2a is formed through the center of the end plate 2. A seal ring 3 is provided in a gap between the end plate and casing 1 in order to seal the junction. For the purposes of this explanation, the distal end of the hand tool is the end facing the polisher 34, which is to the left in FIG. 1.

A circular projection 4 is formed around the top end of the inner surface of the casing 1. A detachable coupler 5 is mounted on the top end of the casing 1 and a circular gasket 6 seals the connection therebetween. A bore hole 5a is formed through the center of the coupler 5. A motor chamber 7 is provided in the casing, with its ends being defined by the end plate 2 and the coupler 5.

A drive shaft 11 extends through the central portion of the motor chamber 7. The drive shaft 11 has its proximal end inserted into the end plate opening 2a and its distal end inserted into the bore hole 5a of the coupler 5. The drive shaft 11 is arranged to rotate without contacting the inner faces of the opening 2a and bore hole 5a thus keeping a clearance $S_3$ between its outer surface and the inner faces of the opening 2a and the bore hole 5a.

Figure 4:
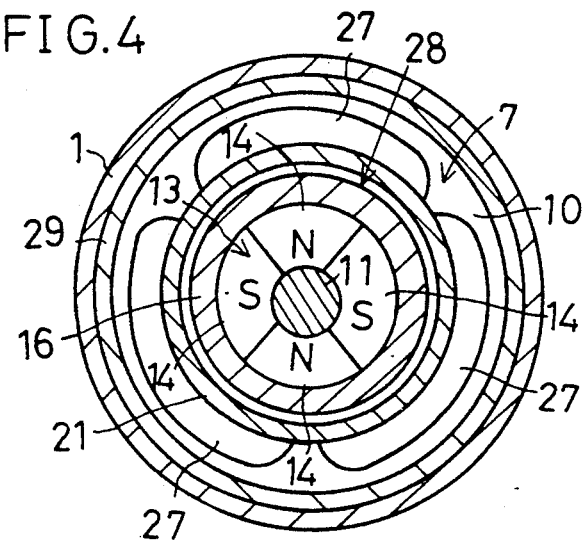
FIG. 4 is an enlarged cross section taken along the line 4—4 shown in FIG. 1.

The drive shaft 11 is supported by a pair of ring bushings 12a and 12b that are journaled about the drive shaft 11 at a predetermined interval within the motor chamber 7. A field magnet 13 is held between the bushings 12a and 12b. The bushings 12a and 12b are formed of a magnetic substance which prevents leakage of magnetic flux in the axial direction of the field magnet 13. As shown in FIG. 4, the field magnet 13 includes four poles 14 alternately arranged around the drive shaft 11 so that the adjoining poles have opposite polarities.

As shown in FIG. 1, annular grooves 15 are cut into the outer periphery of the sides of bushings 12a and 12b that face each other. The opposing ends of a cylindrical jacket 16 is set into the grooves 15 so that the jacket effectively covers the field magnet 13. The jacket 16 is formed of sintered silicon carbide or an alumina sintered material.

A ring magnet 17a is fixed to the proximal end of the back bushing 12a. A second ring magnet 19a is fitted in a recess 18 formed in the end plate 2. Thus, as can be seen in FIG. 1, the ring magnets 17a and 19a face one another to form an opposing magnet pair. Likewise, a ring magnet 17b is fixed to the front end of the front bushing 12b, and a ring magnet 19b is fitted inside a circular projecting rim 20 formed on the coupler 5 at the distal end of the casing 1.

These two opposing magnet pairs are arranged so that like poles face each other. With this arrangement, the magnetic repulsive force tries to push the magnets in each magnet pair apart to form a clearance $S_1$ between the opposing magnets. Thus, the movement of the drive shaft 11 is restricted in the thrust direction.

With this arrangement, a rotor 28 is effectively formed by securing the combination of the bushings 12a and 12b, the field magnet 13, the jacket 16 and the magnets 17a and 17b to the drive shaft 11. The magnet pairs 17a, 19a and 17b, 19b constitute a magnetic thrust bearing for the rotor 28.

As shown in FIG. 1, a cylindrical sleeve 21 is disposed outside the jacket 16. This sleeve 21 is supported between a step 22 formed in the end plate 2 and a step 23 formed in the circular projection 4. The inner surface of the sleeve 21 that faces the outer surface of the jacket 16 is finished smoothly.

The sleeve 21 is made of a ceramic material with a dielectric constant of approximately 10 or below. The ceramic material may include alumina, zirconia, silicon nitride, silica, mullite, sialon (Si—Al—O—N), ro the like. Since silicon carbide has a dielectric constant of about 40, the ceramic material causes a smaller induced current than silicon carbide. The ceramic material also has an excellent electric insulating property, as for example, an electric resistivity of $10^{10}$ Ωm or greater. Additionally, the ceramic material has a high wear resistance and good mechanical strength.

Figure 6:
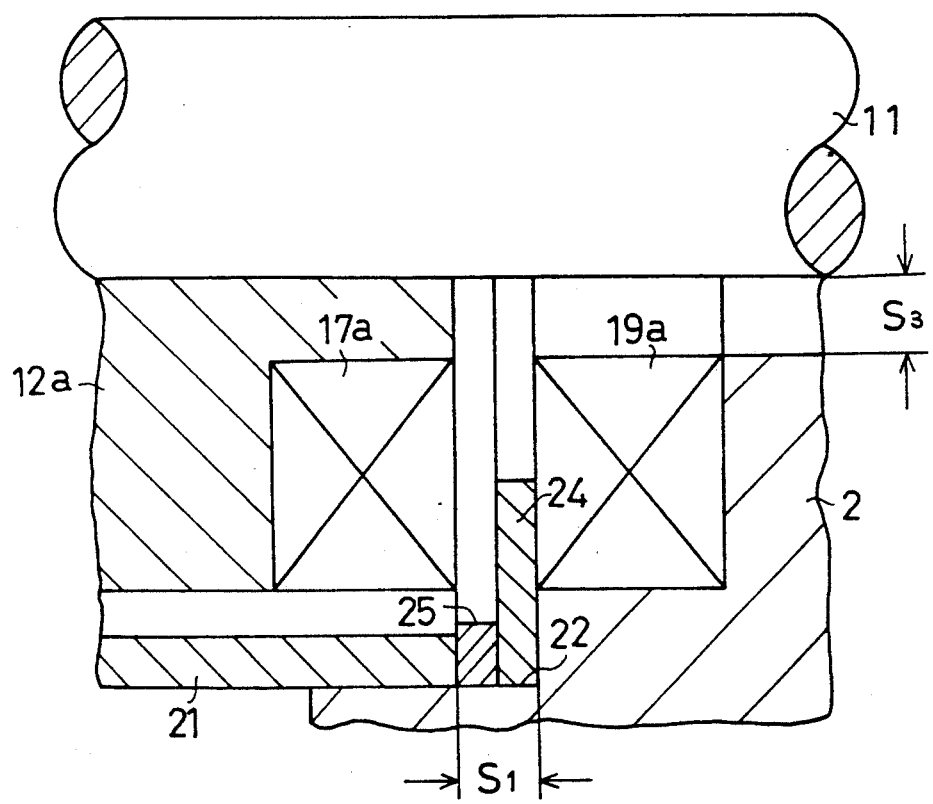
FIG. 6 is a partial enlarged cross section of the thrust bearing shown in FIG. 1.

As shown in FIGS. 1 and 6, a ring spacer 24 which serves as a cushion and a ring washer 25 are fitted between the proximal end portion of the sleeve 21 and the end plate 2. The washer 25 is placed in close contact with the sleeve 21. The ring spacer 24 is in close contact with the plate 2, with its inner periphery fitted between the facing magnets 17a and 19a.

The spacer 24 is made of a heat-resistant resin or a heat-resistant rubber such as a fluoroplastic typified by polytetrafluoroethylene. The reason why the spacer 24 itself should have heat resistance is that the interior of the sleeve 21 should be subjected to heat sterilization from the sanitary view point. The thickness of the spacer 24 is normally determined to be around 0.2 mm. The spacer 24 serves to avoid direct collision between the facing magnets 17a and 19a. The washer 25 is made of a silicone resin.

Figure 2:
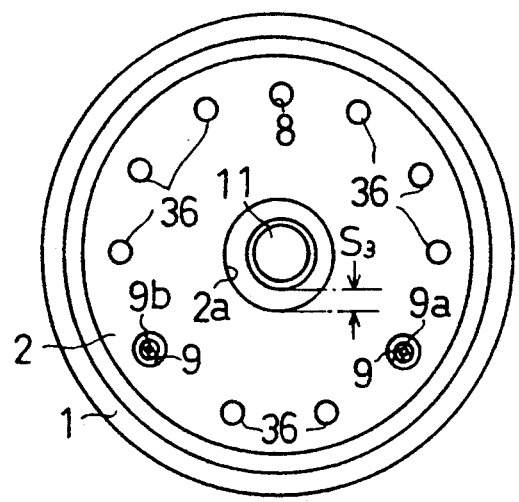
FIG. 2 is an enlarged bottom end view illustrating the dental handtool shown in FIG. 1.

As shown in FIG. 1, a liner 29 is provided inside the casing 1, with hollow space 10 formed between the liner 29 and the sleeve 21. A plurality of air holes 26 are bored in the sleeve 21. As shown in FIGS. 1 and 2, an inlet port 8 is formed in the end plate 2. A blower 30 is connected to the inlet port 8. Air fed out from the blower 30 is therefore delivered to the region between the rotor 28 and the sleeve 21 through the inlet port 8, hollow space 10 and air holes 26. The air pressure effectively keeps the rotor 28 in the sleeve 21 apart. Thus, clearance $S_2$ is kept between the rotor 28 and the inner wall of the sleeve 21, while clearance $S_3$ is kept between the drive shaft 11 and the opening 2a and the bore hole 5a. The jacket 16 of the rotor 28 and the sleeve 21 thus constitute a radial air bearing. The air fed by the blower 30 to the portion between the rotor 28 and the sleeve 21 flows out of the motor via the opening 2a of the end plate 2 and the bore hole 5a of the coupler 5.

To highlight the presence of the air passage in FIG. 1, the clearance $S_2$ is shown wider than the actual size. The clearance $S_2$ is actually several micrometers to several tens of micrometers wide. In the hydrostatic bearing structure, it is desirable that the clearance $S_2$ be set within a range of 10 to 50 μm. In this dental handtool the clearance $S_2$ is set to 20 μm.

As shown in FIGS. 1 and 4, three armature coils 27 are laid at equal distances in the circumferential direction on the outer surface of the sleeve 21. A plurality of Hall effect sensors 31 are provided circumferentially about the center portion of the outer surface of the sleeve 21. Each Hall effect sensor 31 detects the passing poles 14 of the field magnet 13 in rotor 28. The excitation of the armature coils 27 are controlled based on the movements detected by the various Hall effect sensors 31. The rotation of the rotor 28 is controlled based on the magnetic interaction between the magnetic fields sequentially generated by the armature coils 27 and the field magnet 13 of the rotor 28. The motivating unit of the dental handtool is constituted in the above manner.

As shown in FIG. 1, a handpiece 32 is fitted over the coupler 5 at the distal end side of the motor. The handpiece 32 is shaped approximately cylindrical with a narrower distal end portion. A rotatable handpiece shaft 33 extends along the center axis of the handpiece 32. The distal end of the shaft 33 protrudes from the distal end portion of the handpiece 32, and a polisher 34 may be mounted thereto.

A coupling 35 is provided at the free proximal end of the drive shaft 11. When the handpiece 32 is connected with the casing 1 of the motor through the coupler 5, the coupling 35 couples the drive shaft 11 to the handpiece shaft 33. At the distal end portion of the handpiece 32 in the proximity of the polisher 34 an air outlet port, a water outlet port and a light radiation port (all not shown) may each be provided to facilitate the polishing work.

As shown in FIG. 2, a pair of openings 9 are formed in the end plate 2, and openings (not shown) corresponding to the openings 9 are likewise formed in the circular projection 4. A water feed pipe 9a and an optical fiber 9b are located on the passage connecting the openings 9 of the end plate 2, the hollow space 10 and the openings of the circular projection 4. The water feed pipe 9a and the optical fiber 9b are respectively connected to a water feed pipe 39a and an optical fiber 39b on the side of the coupler 5. With this structure, water fed from a water feeding pump (not shown) it delivered to the water outlet port at the distal end of the handpiece 32 via the water feed pipes 9a and 39a. Light from a light source (not shown) is transmitted through the optical fibers 9b and 39b to the light radiation port of the handpiece 32.

As shown in FIG. 2, a plurality of connector openings 36 are formed in the end plate 2 so as to surround the opening 2a. Wires of the motor are inserted through the connector openings 36. These connector openings 36, like the inlet port 8, are connected to the blower 30, so that the air from the blower 30 is fed through the inlet port 8 and connector opening 36 to the motor chamber 7.

Figure 3:
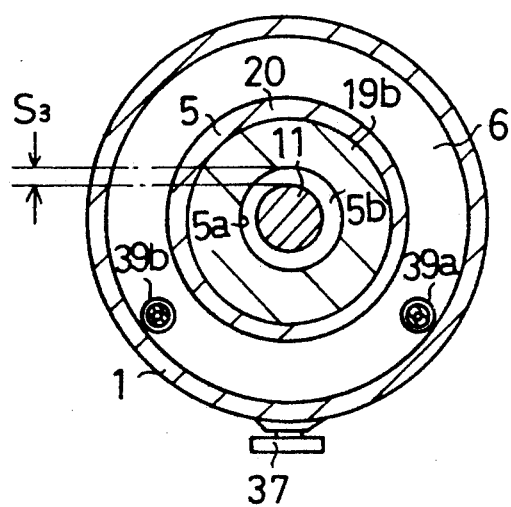
FIG. 3 is an enlarged cross section taken along the line 3—3 in FIG. 1.

As shown in FIGS. 1 and 3, a passage 5b is formed in the handpiece 32 for communication between the bore hole 5a of the coupler 5 and the distal end of the handpiece 32. Air discharged toward the coupler side from the motor chamber 7 is guided through the passage 5b to the air outlet port in the vicinity of the polisher 34.

Figure 5:
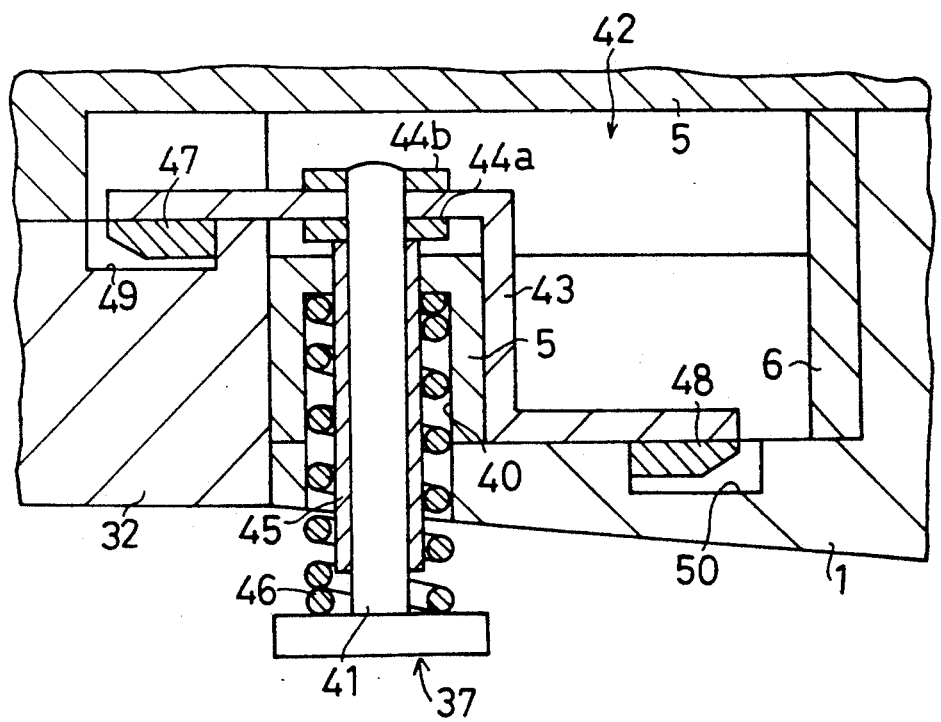
FIG. 5 is an enlarged cross section of an essential part illustrating the latch assembly of a handpiece shown in FIG. 1.

As shown in FIGS. 1 and 5, the handpiece 32 is detachably coupled to the casing 1 by a latch assembly 37 provided on the coupler 5. A radially extending recess 40 is formed in the vicinity of the proximal end of the coupler 5. A supporting sleeve 45 securely fits into the recess 40. A pin 41 is slidably positioned within the sleeve 45. A cavity 42 is formed between the coupler 5 and the distal end of the casing 1, and a leg member 43 is placed in the cavity 42 and is secured to the inner end portion of the pin 41 by means of a pair of nuts 44a and 44b.

A spring 46 is journaled around the sleeve 45 to bias the pin 41 outward. Engaging nubs 47 and 48 are provided at the opposite end portions of the leg member 43. A recess 49 is formed in the inner wall of the proximal end of handpiece 32. The first engaging nub 47 is arranged to engage a projection that forms a wall of the recess 49. A recess 50 is formed in the inner wall at the distal end of casing 1. The second engaging nub 48 is arranged to engage a wall of the recess 50.

The latch assembly 37 includes the pin 41, the leg member 43 and the spring 46, as described above. By pressing the pin 41 against the force of the spring 46 displaces the leg member 43 radially inward, thereby disengaging the engaging nubs 47 and 48 from the walls of their respective recesses 49 and 50. This permits the handpiece 32 and the coupler 5 to be detached from the casing 1. Release of the pressure on the pin 41 urges the pin 41 and the leg member 43 to return by the force of the spring 46, causing the nubs 47 and 48 to be engage the walls of their respective recesses 49 and 50. Accordingly, the handpiece 32 and the coupler 5 are intergrally mounted to the casing 1.

When the dental handtool described above is used, excitation of the individual armature coils 27 is controlled. At this time, the load of the rotor 28 in the thrust direction is softened by the magnetic repulsive force of the magnet pairs 17a and 19a and 17b and 19b, and the load of the rotor 28 in the radial direction is softened by the pressurized air introduced into the portion between the jacket 16 and the sleeve 21. The rotor 28 can therefore rotate stably while avoiding contact with the individual members in the motor chamber 7. The power of the drive shaft 11 that rotates together with the rotor 28 is transmitted via the coupling 35 to the handpiece shaft 33, which rotates the polisher 34.

According to this embodiment, the sleeve 21 is made of a ceramic material with a dielectric constant of 10 or below. Even when the sleeve 21 is influenced by the magnetic field produced by the armature coils 27, therefore, no excessive induced current will occur in the sleeve 21 and the magnetic energy will not be wasted as Jules heat. Most of the magnetic energy is therefore converted into kinetic energy for the rotor 28, thus ensuring efficient rotation of the rotor 28.

It is desirable that the thickness of the sleeve 21 be set to 3 mm or below because if the sleeve 21 is thicker than 3 mm, the gap between the armature coils 27 and the field magnet 13 of the rotor 28 becomes too large, resulting in considerable reduction in motor efficiency. It is also desirable that the diameter of the sleeve 21 be set to 50 mm or smaller because if the sleeve 21 with a thickness of 3 mm or thinner has a diameter of greater than 50 mm, the mechanical strength of the sleeve 21 is reduced, making it difficult to substantially produce the sleeve.

At the time the rotor 28 is started, the rotor 28 slides in contact with the sleeve 21 until it is completed lifted up by air pressure. As the ceramic material for the sleeve 21 also has an excellent wear resistance, the in-contact sliding movement does not significantly wear out the sleeve 21.

According to this dental handtool, the coupler 5 constitutes a part of the thrust bearing and serves to close the motor chamber 7. The motor chamber 7 can be easily opened by simply removing the coupler 5 from the casing 1. Accordingly, the rotor 28 can be removed from the motor chamber 7 without removing the sleeve 21 therefrom. If various foreign particles enter the clearances $S_1$ and $S_2$ at the individual bearings, they can easily be removed, facilitating the maintenance of the dental handtool.

According to this embodiment, since the disassembling and assembling of the dental handtool is very easy, the individual members can be sterilized piece by piece. Thus, this embodiment can ensure better sterilization when compared with conventional dental handtools that needs to be sterilized with the rotor kept mounted to the casing.

As the dental handtool according to this embodiment employs the hydrostatic air bearing and magnetic bearing as a bearing structure for the rotor 28, it is unnecessary to put lubrication oil in the bearing portion. This simplifies cleaning of the dental handtool after its disassembly.

When the dental handtool is not in use, the handtool is usually kept attached to the handpiece 32 and retained in the holder with the polisher 34 facing upward. When the use of the handtool is completed, it may be just thrown into the holder. When this happens, an impact (measured 1.0 kgf or greater) that is greater than the magnetic repulsive force (set to about 0.8 kgf) of the magnets 17a and 19a may be applied to the rear thrust magnetic bearing.

The spacer 24 however reduces the impact of the collision of the magnet 17a on the rotor side with the magnet 19a on the end plate side. It is therefore possible to prevent the thrust bearing from being damaged by the impact and improve the durability of the dental handtool. As the dental handtool will not be damaged when handled somewhat roughly, this tool is easier to handle than the prior art handtools.

If the spacer 24 is formed of polytetrafluoroethylene, its wear resistance is improved. When the rotor 28 slides in contact with the spacer 24, therefore, the spacer 24 will not wear out, thus elongating the service life of the spindle motor.

A detailed description will be given of the wiring circuit formed on the sleeve 21 and how to form the circuit.

As shown in FIG. 4, three Hall effect sensors 31 are attached on the outer surface of the sleeve 21. Each Hall effect sensor 31 is an integrated circuit (IC) which detects the associated pole of the field magnet 13 in the rotor 28 and outputs a predetermined signal in accordance with a polar change. The Hall effect sensors 31 are each provided with a source terminal, an earth terminal and a signal terminal (none shown).

Figure 7:
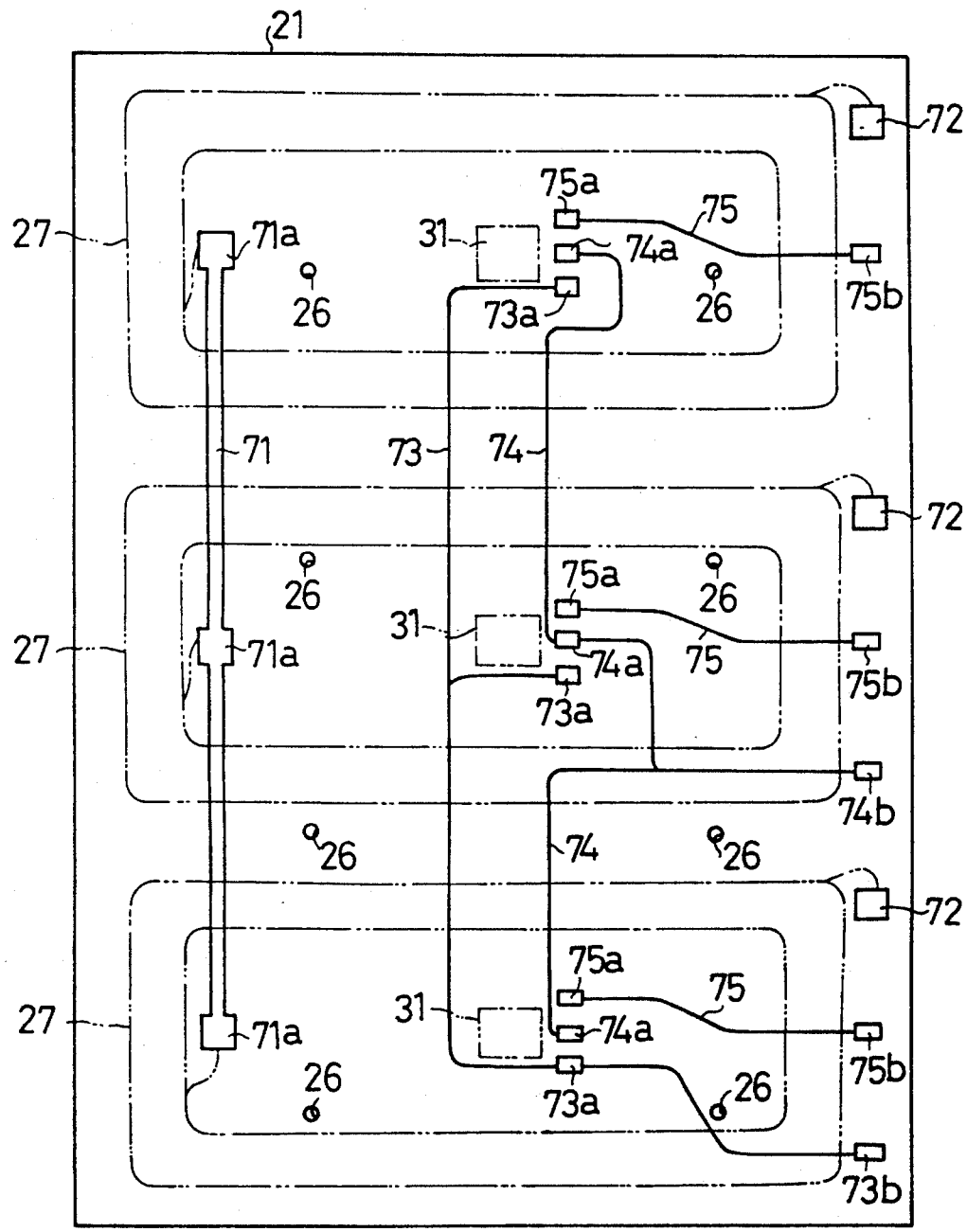
FIG. 7 is a development diagram illustrating the sleeve shown in FIG. 1.

As shown in FIG. 7, a printed circuit ground wire 71 is attached to the outer surface of the sleeve 21 to power the armature coils 27. The ground wire 71 has three contacts 71a each of which is soldered to one end of the winding of the associated armature coils 27. Three separate contacts 72 are formed on the outer surface of the sleeve 21. The other end of the winding of each armature coil 27 is soldered to the associated contact 72. The individual armature coils 27 are connected to an external power source (not shown) through the contacts 72.

A source line 73, an earth line 74 and three signal lines 75 are formed as the line circuit for the Hall effect sensors 31 on the outer surface of the sleeve 21.

The source line 73 has three contacts 73a where the source terminals of the Hall effect sensors 31 are respectively connected, and a terminal 73b where the external power source is connected. Likewise, the earth line 74 has three contacts 74a where the earth terminals of the Hall effect sensors 31 are respectively connected, and a terminal 74b where an external earth line is connected.

Each signal line 75 is provided with a terminal 75a where the signal terminal of the associated Hall effect sensor 31 is soldered and a contact 75b where an external control device (not shown) is coupled. The external control device is a unit which controls the power supply to the individual armature coils 27 based on the magnetic detection signals from the individual Hall effect sensors 31.

The ground wire 71, the contacts 72, the source line 73, the earth line 74 and the signal lines 75 are formed on the outer surface of the sleeve 21 before assembling the spindle motor. In other words, the printed wiring lines 71 to 75 are formed by performing screen printing with a conductive paste while rotating the sleeve 21.

This conductive paste consists of a mixture by formulating a thermosetting resin and a dispersion solvent to copper particles. The viscosity of paste is controlled by mainly changing the amount of the dispersion solvent. Screen printing on the outer surface of the sleeve 21 is carried out through the following three procedures (1) to (3).

(1) With the use of a conductive paste with a viscosity of 300 to 1000 poises, all portions of the printed wiring lines (71a, 72, 73a, 73b, 74a, 74b, 75a and 75b) other than soldering contacts are printed on the outer surface of the sleeve 21. Then, the printed surface is heated at 200° C. for ten minutes to harden the paste on the printed surface, thus forming a connecting portion having a thickness in the range of 30 to 50 $\mu$m.

(2) With the use of a conductive paste with a viscosity of 1000 to 2000 poises, the soldering portions of the wiring lines (71a, 72, 73a, 73b, 74a, 74b, 75a and 75b) are printed on the outer surface of the sleeve 21. Then, the printed surface is heated at 200° C. for five minutes to harden the paste on the printed surface, thus forming soldering portion having a thickness in the range of 50 to 100 $\mu$m.

(3) A solution of a thermosetting resin used for the conductive paste is coated on the entire outer surface of the sleeve 21. Then, the coated surface is heated at 200° C. for five minutes to harden the resin, thus forming a coating film having a thickness in the range of 50 to 100 $\mu$m on the outer surface of the sleeve 21. This film has a heat resistance of about 150° to 200° C.

In assembling this spindle motor, the individual armature coils 27 and Hall effect sensors 31 are positioned where determined with the contacts and terminals 71a, 72, 73a, 74a and 75a formed in advance on the sleeve 21 as reference points. To the contacts and terminals are respectively soldered the end portions of the windings of the armature coils 27, and the source terminals, earth terminals and signal terminals of the Hall effect sensors 31. The armature coils 27 and the Hall effect sensors 31 are thus secured on the outer surface of the sleeve 21 and are mutually connected together. The film covering the surfaces of these contacts and terminals is removed by decomposition by the heat generated at the time soldering is conducted.

Subsequently, the leads of the external power source, the external control device, etc. are soldered to the individual contacts 72, 73b, 74b and 75b on the outer surface of the sleeve 21. Then, the sleeve 21 and the rotor 28 are mounted together with the thrust magnetic bearing in the casing 1, thus completing the drive unit for the dental handtool.

According to this embodiment, as the armature coils 27 and the Hall effect sensors 31 are soldered to the line circuit formed in advance on the outer surface of the sleeve 21, the drive unit for the dental handtool can easily be assembled. This simplifies the motor assembling procedures and improves the productivity of spindle motors, whereas if the armature coils 27 and the Hall effect sensors 31 are secured on the sleeve 21 without forming any line circuit on the outer surface of the sleeve 21, and are then electrically connected by leads, this connecting work would be very troublesome.

Further, the armature coils 27 and the Hall effect sensors 31 can be accurately placed at determined positions with the line circuit on the sleeve 21 as a reference. The armature coils 27 and Hall effect sensors 31 are positioned at equiangular distances as designed on the outer surface of the sleeve 21. Based on the control of the excitation of the armature coils 27, the coils 27 and the individual poles of the field magnet 13 of the rotor 28 periodically exert a magnetic influence to each other. The rotor 28 can therefore rotate stably without a variation in the revolution.

It is to be noted that the following modifications may be made to the first embodiment.

(a) Multiple pairs of latch assemblies 37 may be provided to the coupler 5.

(b) The latch assembly 37 may be replaced with a pin-shaped engaging member to integrally link the casing 1, the coupler 5 and the handpiece 32.

(c) Instead of using the washer 25 of a silicone resin, a silicone resin may be directly coated on the surface of the spacer 24. (d) A second spacer is provided between the front magnet 17b of the rotor 28 and the magnet 19b of the coupler 5.

(e) In the screen printing on the outer surface of the sleeve 21, the connecting portion and the soldering portion of the printed wiring are simultaneously formed in a single printing step.

(f) After the printed wiring is printed on the outer surface of the sleeve 21, guide lines or marks for indicating where the armature coils 27 and Hall effect sensors 31 should be positioned are printed.

Second Embodiment

Figure 8:
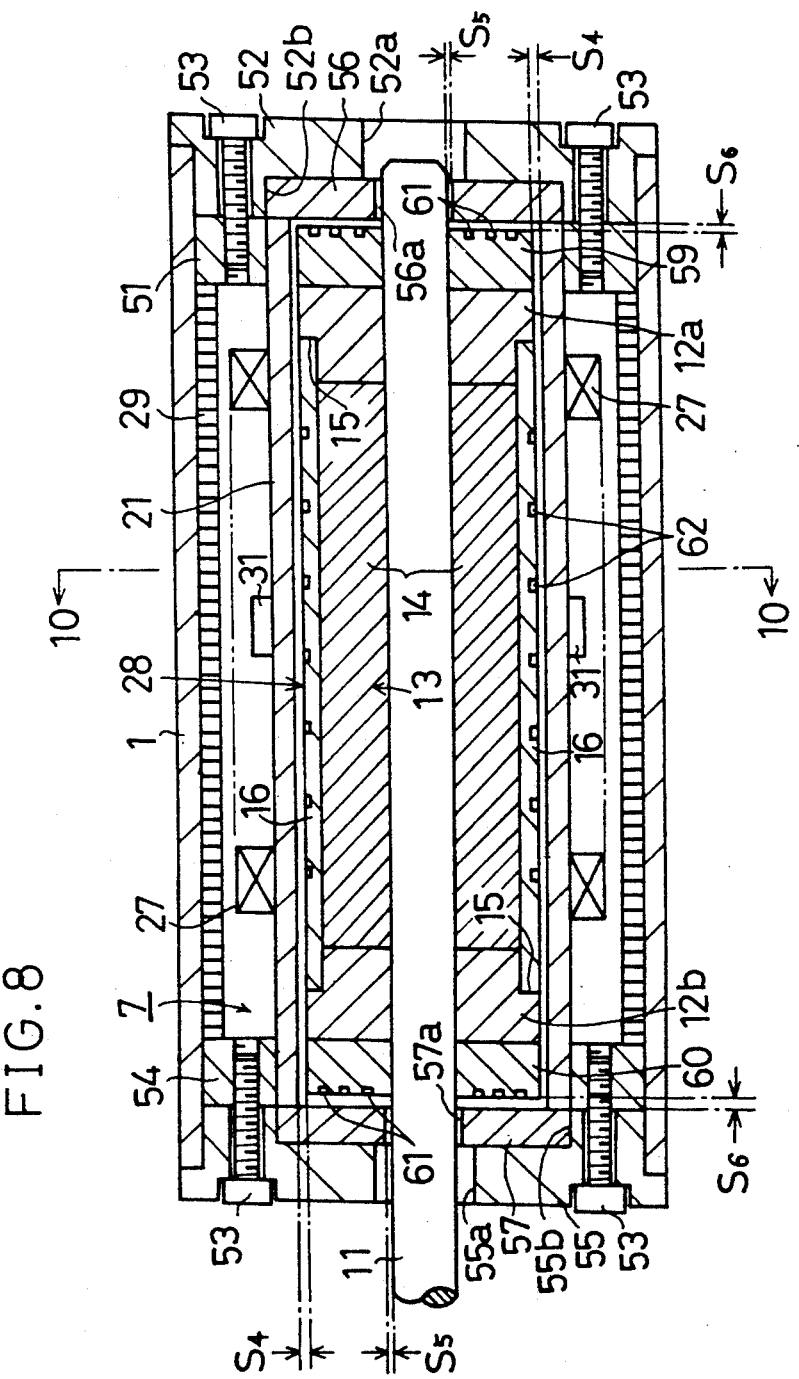
FIG. 8 is a cross section showing a second embodiment of the present invention.
Figure 9:
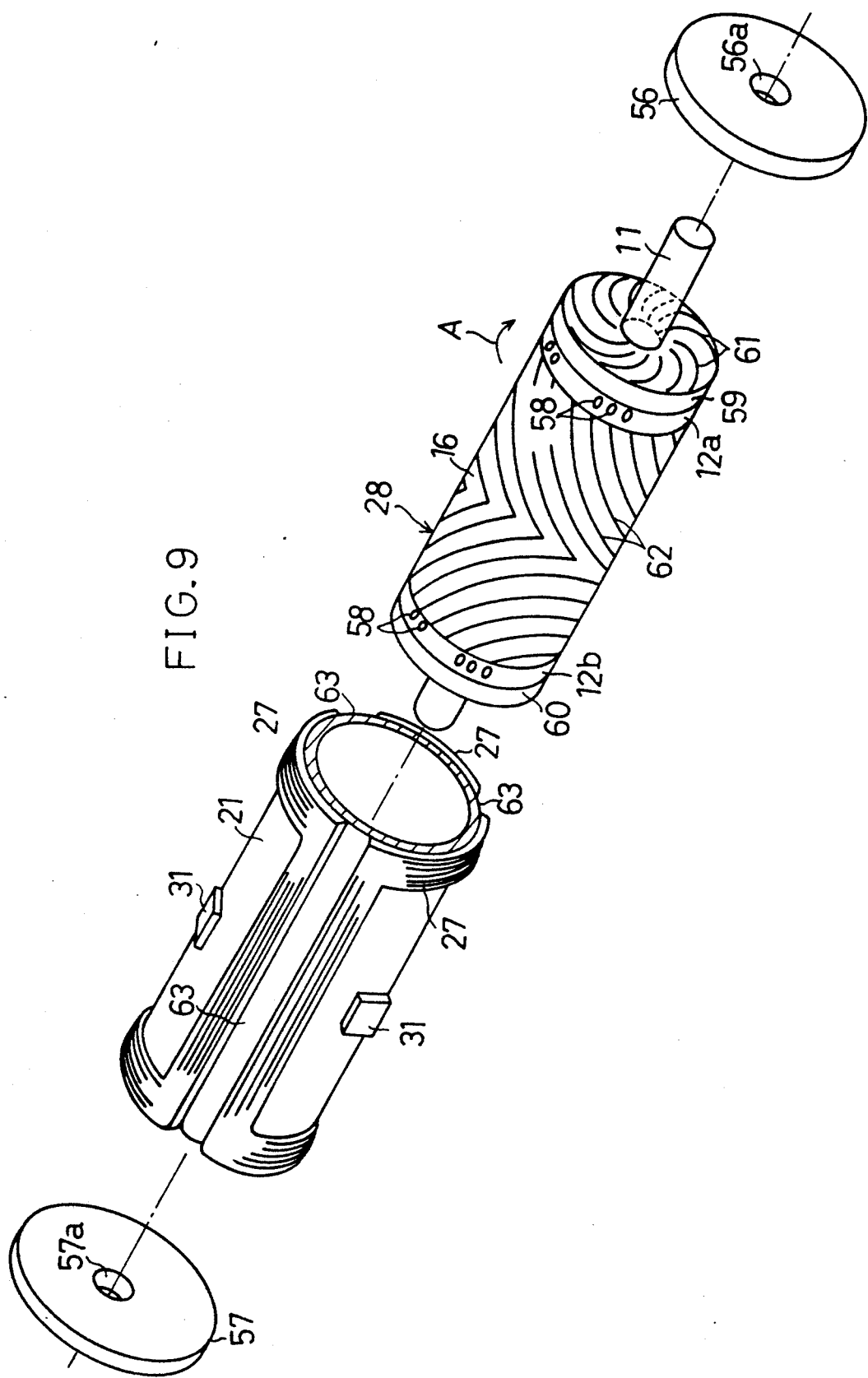
FIG. 9 is an exploded perspective view illustrating members constituting an air bearing in the embodiment shown in FIG. 8.
Figure 10:
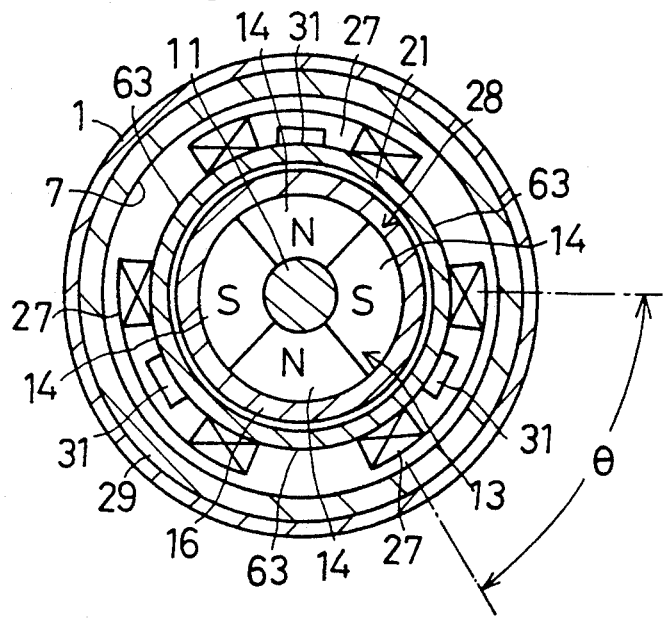
FIG. 10 is a cross section taken along the ling 10—10 in FIG. 8.

Referring now to FIGS. 8 through 10, a description will now be given of a second embodiment where a self-acting bearing structure is employed in a spindle motor constituting a dental handtool. Those members used in the first embodiments which are also used in the spindle motor of the second embodiment are given the same reference numerals.

As shown in FIG. 8, an attaching member 51 is mounted to the inner wall of the rear end portion (right end portion) of a casing 1. A first end plate 52 is secured to the outer surface of the attaching member 51 by means of a plurality of screws 53. Likewise, an annular attaching member 54 is secured to the inner wall of the front end portion (left end portion) of the casing 1, and a second end plate 55 is secured to the outer surface of the attaching member 54 by means of multiple screws 53. A motor chamber 7 is formed in the space in the casing 1 surrounded by the end plates 52 and 55.

Openings 52a and 55a are formed in the center portions of the first and second end plates 52 and 55, respectively. Steps 52b and 55b are provided on the respective end plates 52 and 55, both facing motor chamber 7. Ceramic plates 56 and 57 are respectively fitted in the steps 52b and 55b. The disk shaped ceramic plates 56 and 57 are each formed of a sintered silicon carbide, with bore holes 56a and 57a formed in the center portions of the ceramic plates 56 and 57, respectively.

A drive shaft 11 is positioned along the axis of motor chamber 7. The proximal end of shaft 11 passes through the bore hole 56a of the ceramic plate 56 and its distal end passes through the bore hole 57a of the other ceramic plate 57. Thus, the drive shaft 11 is positioned for rotation within both bore holes 56a and 57a.

As shown in FIGS. 8 and 9, a pair of spaced apart bushings 12a and 12b are fixed at a given interval on the drive shaft 11. A field magnet 13 is held between the bushings 12a and 12b. As shown in FIG. 10, the field magnet 13 has four poles 14 as per the first embodiment.

As shown in FIGS. 8 and 9, annular grooves 15 are cut in those peripheral portions of the bushings 12a and 12b which face each other, with a jacket 16 held between both bushings. The jacket 16 is made of sintered silicon carbide, and has a plurality of herringbone grooves 62 formed in its outer surface.

A sleeve 21 is held between the end plates 52 and 55 by the attaching member 51 and 54 and the ceramic plates 56 and 57. The sleeve 21 is formed of a ceramic material with a dielectric constant of 10 or below as set forth in the first embodiment. The inner wall of the sleeve 21 that faces the outer surface of the jacket 16 is finished smoothly so that it can slide smoothly across the jacket 16.

Disk shaped ceramic plates 59 and 60 are secured on the outer walls of the bushings 12a and 12b, respectively. The ceramic plates 59 and 60 are each formed of a sintered silicon carbide, and face the ceramic plate 56 of the first end plate 52 and the ceramic plate 57 of the second end plate 55, respectively. A plurality of spiral grooves 61 are formed in the surfaces of the ceramic plates 59 and 60 which face each other. The surfaces of the ceramic plates 56 and 57 on the fixed side which face the ceramic plates 59 and 60 on the movable side are finished smoothly insure that they can easily slide across the ceramic plates 59 and 60.

With this arrangement, the rotor 28 is formed by integrally securing the bushings 12a and 12b, the field magnet 13, the jacket 16 and the ceramic plates 59 and 60 to the drive shaft 11. As shown in FIG. 9, a plurality of recess 58 are formed in the outer surface of each of the bushings 12a and 12b and a balancer (not shown) can be detachably coupled to the recesses 58. The balancer can arbitrarily adjust the load balance of the rotor 28.

When the rotor 28 in is rotated in the direction of arrow A (as seen in FIG. 9), the grooves 62 form a pressurized air film between the jacket 16 and the sleeve 21. The pressurized air film permits the rotor 28 to be supported apart from the sleeve 21. At this time, the rotor 28 is separated from the sleeve 21 by a clearance $S_4$, and the drive shaft 11 is separated from the bore holes 56a and 57a of both ceramic plates 56 and 57 by a clearance $S_5$, thus restricting the radial directional movement of the rotor 28.

Likewise, the rotation of the rotor 28 in the direction of arrow A causes the grooves 61 to form pressurized air films between the ceramic plates 56 and 59 and the ceramic plates 57 and 60. The pressurized air film supports the rotor 28 without requiring any contact with the ceramic plates 56 and 57 on the fixed side. This separation is seen as clearance $S_6$. This restricts the thrust directional movement of the rotor 28.

The jacket 16 provided with the herringbone grooves 62 and the sleeve 21 constitute the radial air bearing in the above described device. The ceramic plates 59 and 60 provided with the spiral grooves 61 and the ceramic plates 56 and 57 on the fixed side constitute the thrust air bearing.

For easier understanding of the presence of the air passage in FIG. 8, the clearances $S_4$ and $S_6$ are shown wider than the actual size. The clearance $S_4$ and $S_6$ are actually set several μm to several tens of μm wide. Because the size of the clearance $S_4$ and $S_6$ greatly influences the rigidity of the air bearing, it is desirable that particularly the clearance $S_4$ of the radial air bearing be set within a range of 3 to 20 μm. By way of example, the clearance $S_4$ may be set to be slightly wider than 3 μm, and the clearance $S_6$ to about 5 μm.

As shown in FIGS. 8 to 10, a liner 29 is formed on the inner wall of the casing 1 as per the first embodiment. Further three armature coils 27 and three Hall effect sensors 31 are disposed at equidistance on the outer surface of the sleeve 21. As shown in FIG. 10, the arrangement angle θ of the individual armature coils 27 is set nearly 60°, with three spaces 63 present between adjoining armature coils 27.

These spaces 63 occupy about 25% of the entire area of the portion where the armature coils 27 are provided on the sleeve 21. In the spaces 63 pipes (not shown) are provided for feeding air and water to the handpiece which is to be mounted to the distal end of the motor, and electric lines.

When excitation of the individual armature coils 27 starts based on the detection of the poles 14 of the field magnet 13 by the associated Hall effect sensors 31, the rotor 28 rotates in the direction of arrow A as per the first embodiment. Consequently, the radial air bearing and the thrust air bearing act to permit the rotor 28 to stably rotate without contacting other features in the motor chamber 7.

According to this embodiment, since the radial and thrust bearing means take the form of air bearings, the loads of the rotor 28 in the radial and thrust directions can be supported without causing any contact. The bearing structure of this spindle motor, unlike the ball bearing or the like of the conventional spindle motor, can to a large extent avoid wear, thus ensuring an elongated life of the motor. It is to be noted that this motor has a thrust load capacity of about 300 g and a radial load capacity of about 2000 g.

As this spindle motor is brushless and employs the air bearing structure, it enables a high speed rotation in the range of about 2000 to 40000 rpm. The use of the air bearing structure facilitates making the motor more compact than the prior art motor. Actually, the diameter of the casing 1 in this embodiment is as very small, as for example, 22 mm.

According to this embodiment, the sleeve 21 is formed of a ceramic material with a dielectric constant of 10 or below, so that most of the magnetic energy of the armature coils 27 is converted into kinetic energy for the rotor 28, thus ensuring efficient rotation of the rotor 28. The jacket 16 of silicon carbide does not affect the magnetic interaction between the field magnet 13 and the armature coils 27, and does not interfere with the smooth rotation of the rotor 28.

It is to be noted that the following modifications may be made to the second embodiment.

(a) The herringbone grooves may be formed in the inner wall of the sleeve 21, not the outer surface of the jacket 16.

(b) The spiral grooves may be formed in the ceramic plates 56 and 57 on the fixed side, not the ceramic plates 59 and 60 on the side of the rotor 28.

(c) The thrust air bearing may be replaced with the thrust magnetic bearing as employed in the first embodiment.

Third Embodiment

Figure 11:
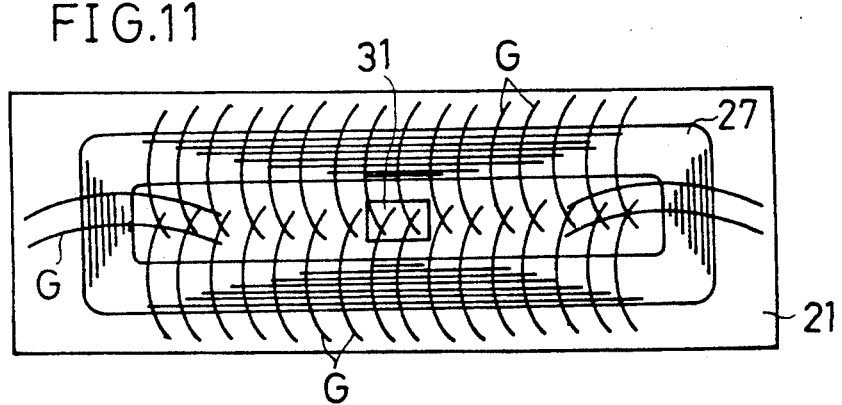
FIG. 11 is a diagram illustrating the positional relationship between an armature coil and a Hall effect sensor in the first and second embodiments.

As shown in FIG. 11, the Hall effect sensor 31 is disposed in the center portion of the winding space of each armature coil 27 in the first and second embodiments described above. Further, when the armature coils 27 are excited, the line of magnetic force G generated by armature coils 27 concentrates in the winding spaces of the armature coils 27. Each Hall effect sensor 31 detects not only the magnetism of the field magnet 13 of the rotor 28, but also the line of magnetic force G and noise originated from the excitation of the armature coils 27.

The Hall effect sensors 31 cannot be arranged to detect only the magnetism of the field magnet 13. At time this may result in inaccurate or improper control of the excitation of the armature coils 27. As a result, the rotational control of the rotor 28 will be affected to impede to the steady rotation of the rotor 28. In particular, when the rotor 28 rotates at a low speed and the number of detections by the Hall effect sensor 31 per unit time is small, the accuracy of the detection of magnetism by the Hall effect sensor 31 tends to become poor. It is not therefore possible to perform steady rotational control of the rotor 28 at a low speed.

Figure 12:
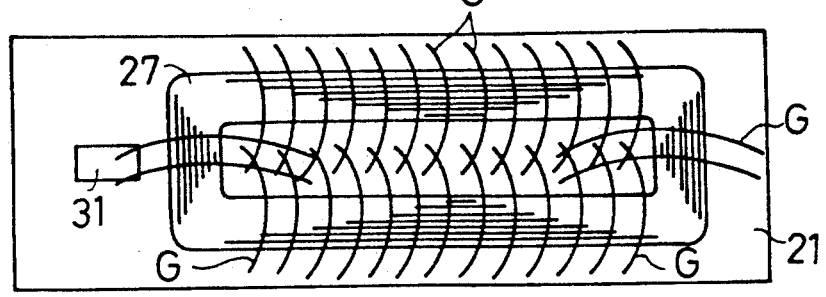
FIG. 12 is a diagram showing the positional relationship between an armature coil and a Hall effect sensor in a third embodiment.

According to a third embodiment, as shown in FIG. 12, the Hall effect sensor 31 is located outside the winding space of the associated armature coil 27, and the armature coil 27 and the Hall effect sensor 31 extend in parallel in the axial direction of the sleeve 21. When the armature coils 27 are excited to produce the line of magnetic force G, therefore, the influences of the line of magnetic force G and noise appearing on the magnetic force G will hardly be transmitted to the Hall effect sensors 31.

When the rotor 28 rotates at a low speed, therefore, each Hall effect sensor 31 can surely detect the magnetism of the field magnet 13. This results in accurate control of the excitation of the armature coils 27 to execute steady rational control of the rotor 28 over the entire speed range.

The following modifications may be made to the third embodiment.

(a) The Hall effect sensor 31 may be arranged in the space 63 between adjoining armature coils 27.

(b) Other sensors than the Hall effect sensor 31, such as a magnetic resistance element, may be used as a sensor to detect the magnetism.

Although only three embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A spindle motor comprising:
   a rotor having a field magnet with multiple poles;
   a sleeve for rotatably supporting the rotor, the sleeve being formed of a ceramic material with a dielectric constant of approximately 10 or below;
   a pressure generating means for creating sufficient air pressure in a clearance between the rotor and the sleeve to form a pressurized air film in the clearance when the spindle motor is in normal operation, the pressurized air film being sufficient to radially supports the rotor such that the rotor does not significantly contacting the sleeve during normal operation of the spindle motor;

a plurality of armature coils provided on an outer surface of the sleeve, the armature coils cooperating with the field magnet to rotate the rotor by the magnetic interaction between magnetic fields formed by the armature coils and the poles of the field magnet; and a plurality of magnetic sensors, provided on the outer surface of the sleeve, the magnetic sensors providing signals indicative of the magnetism of the poles of the field magnet of the rotor, whereby excitation of the armature coils is controlled based at least in part on the signals provided by the magnetic sensors.

2. A spindle motor according to claim 1, wherein the ceramic material is one selected from the group consisting of alumina, zirconia, silicon nitride, silica, mullite and sialon.

3. A spindle motor according to claim 1, wherein the pressure generating means includes:
a blower for supplying compressed air; and
multiple air holes formed in the sleeve for introducing the compressed air from the blower into clearance between the rotor and the sleeve.

4. A spindle motor according to claim 1, wherein the pressure generating means includes grooves formed in either the outer surface of the rotor or the inner wall portion of the sleeve which faces the outer surface of the rotor, the grooves producing a pressurized air film in the clearance as the rotor rotates.

5. A spindle motor according to claim 1, wherein the printed circuit wiring pattern for connecting the armature coils to the magnetic sensors is formed on the outer surface of the sleeve.

6. A spindle motor according to claim 1, wherein the rotor further comprises:
a drive shaft;
a pair of bushings provided on the drive shaft; and
a jacket made of alumina or silicon carbide for covering the field magnet; and
wherein the poles of the field magnet are arranged alternately around the drive shaft between the pair of bushings so that those adjacent poles have opposite polarities.

7. A spindle motor according to claim 1, wherein the armature coils each have a winding region, and the magnetic sensors are located outside of the winding regions of the armature coils.

8. A spindle motor according to claim 1, further comprising a magnetic bearing including a pair of first magnets provided on the respective end portions of the rotor, and a pair of second magnets provided facing the respective first magnets, the magnetic bearing supporting the rotor in a non-contacting state in a thrust direction.

9. A spindle motor according to claim 8, wherein a spacer is provided in a clearance formed between a selected one of the first magnets and its associated second magnet, the clearance being formed by the magnetic interaction therebetween, the spacer being arranged for preventing the first magnets from directly hitting against the second magnet, the spacer being sized narrower than a width of the clearance.

10. A spindle motor according to claim 9, wherein the spacer is made of a heat-resistant rubber or resin.

11. A spindle motor according to claim 4, further comprising a self-acting bearing including:
a pair of first ceramic plates provided at the respective end portions of the rotor;
a pair of second ceramic plates provided facing the respective first ceramic plates; and
spiral grooves formed in the surfaces of at least one pair of the first ceramic plates and the second ceramic plates which face each other, for producing a pressurized air film between a clearance between the first ceramic plates and the second ceramic plates as the rotor rotates,
whereby the self-acting bearing supports the rotor in an non-contacting state in a thrust direction.

12. A spindle motor according to claim 11, wherein the first and second ceramic plates are made of silicon carbide.

13. A spindle motor comprising:
a rotor including a drive shaft, a pair of bushings carried by the drive shaft, a field magnet having a plurality of poles alternating poles, the field magnet being positioned between said bushings, and a jacket for covering the field magnet;
a sleeve for rotatably supporting the rotor, the sleeve being formed from a ceramic material having a dielectric constant of approximately 10 or below;
a blower for supplying compressed air;
a plurality of air holes formed in the sleeve for introducing the compressed air from the blower into a clearance between the rotor and the sleeve, the introduced air radially supporting the rotor in an non-contacting state in the sleeve when the spindle motor is in normal operation;
a plurality of armature coils provided on an outer surface of the sleeve, the armature coils cooperating with the field magnet to rotate the rotor by the magnetic interaction between magnetic fields formed by the armature coils and the poles of the field magnet; and
a plurality of magnetic sensors, provided on the outer surface of the sleeve, the magnetic sensors providing signals indicative of the magnetism of the poles of the field magnet of the rotor, whereby excitation of the armature coils is controlled based at least in part on the signals provided by the magnetic sensors.

14. A spindle motor according to claim 13, wherein the ceramic material is one selected from the group consisting of alumina, zirconia, silicon nitride, silica, mullite and sialon, and the jacket for the rotor is made of alumina or silicon carbide.

15. A spindle motor according to claim 13, wherein the clearance between the rotor and the sleeve is set to be in a range of 10 to 50 $\mu m$.

16. A spindle motor according to claim 13, further comprising a magnetic bearing including a pair of first magnets provided on the respective end portions of the rotor, and a pair of second magnets provided facing the respective first magnets, the magnetic bearing supporting the rotor in an non-contacting state in a thrust direction.

17. A dental handtool comprising:
a brushless motor including a sleeve fixed in a casing, a rotor rotatably accommodated in the sleeve and a plurality of armature coils provided on an outer surface of the sleeve, the rotor having a field magnet with a plurality of poles, and the sleeve being formed of a ceramic material with a dielectric constant of approximately 10 or below;

a handpiece, provided with a power transmission mechanism for transmitting rotation of the rotor to a polisher, for rotatably supporting the polisher;

a coupler for coupling the handpiece to the casing of the motor, the coupler preventing the rotor from coming out of the sleeve when attached to the casing, and permitting the rotor to be removed from the sleeve when detached from the casing; and an engaging means for securely coupling the coupler and the handpiece together to the casing of the motor, whereby the coupler is removed from the casing of the motor in accordance with an operation of the engaging means.

18. A dental handtool according to claim 17, further comprising a blower for supplying compressed air, and multiple air holes formed in the sleeve to introduce the compressed air from the blower into a clearance between the rotor and the sleeve, whereby the compressed air introduced in the clearance radially supports the rotor in an non-contacting state with respect to the sleeve.

19. A dental handtool according to claim 17, wherein the rotor has a pair of magnets provided on the respective end portions thereof, a magnet provided in the casing, facing the magnet on the rear end portion of the rotor, and a magnet provided on the coupler, facing the magnet on the front end portion of the rotor, whereby the rotor is supported in an non-contacting state in the sleeve in a thrust direction.

20. A dental handtool according to claim 19, wherein a spacer is provided in a clearance formed between the magnet on the rear end portion of the rotor and the magnet provided in the casing to face the former magnet by magnetic interaction therebetween for preventing direct collision between the facing magnets, the spacer being narrower than a width of the clearance.

* * * * *